United States Patent
Kayama

(10) Patent No.: US 10,110,847 B2
(45) Date of Patent: Oct. 23, 2018

(54) PROGRAM IMAGE CREATION METHOD AND APPARATUS OF THE SAME

(71) Applicants: 4COLORS Inc., Yokohama-shi (JP); Rokuro Kayama, Yokohama-shi (JP); Ken Ogawa, Yokohama-shi (JP)

(72) Inventor: Rokuro Kayama, Yokohama (JP)

(73) Assignees: 4COLORS INC., Yokohama-shi (JP); ROKURO KAYAMA, Yokohama-shi (JP); Ken Ogawa, Yokohama-shi (JP)

( * ) Notice: Subject to any disclaimer, the term of this patent is extended or adjusted under 35 U.S.C. 154(b) by 255 days.

(21) Appl. No.: 13/961,273

(22) Filed: Aug. 7, 2013

(65) Prior Publication Data
US 2014/0043429 A1     Feb. 13, 2014

(30) Foreign Application Priority Data
Aug. 8, 2012   (JP) .................................. 2012-176123

(51) Int. Cl.
*H04N 7/14*   (2006.01)
*G11B 27/031*   (2006.01)

(52) U.S. Cl.
CPC ........... *H04N 7/141* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 2006/0020548 A1* | 1/2006 | Flather | H04N 21/4316 705/51 |
| 2011/0113423 A1* | 5/2011 | Yamamoto | G06F 8/60 717/178 |
| 2011/0298805 A1* | 12/2011 | Laurito | G06Q 40/06 345/440 |

FOREIGN PATENT DOCUMENTS

| | | |
|---|---|---|
| JP | 2004-179696 | 6/2004 |
| JP | 2010-003203 | 1/2010 |
| JP | 4725918 | 4/2011 |
| JP | 2011-114374 | 6/2011 |
| JP | 4725918 | 7/2011 |

OTHER PUBLICATIONS

"xtranormal tutorial"; https://www.youtube.com/watch?v=DtWl-em062l; Published on Jan 24, 2010.*

(Continued)

*Primary Examiner* — Zhengxi Liu
(74) *Attorney, Agent, or Firm* — Hamre, Schumann, Mueller & Larson, P.C.

(57) ABSTRACT

A program image creation method that allows two-way communication for communication in a format of questions and answers. The method includes: a description image processing step of setting a description image based on image selection information; a voice processing step of synchronizing a voice from voice input information with the description image; an avatar processing step of combining an avatar that is set based on avatar selection information with the description image; a decoration processing step of combining a decoration material that is set based on decoration selection information with the description image; and an interactive processing step of setting a hyperlink based on interactive selection information.

16 Claims, 9 Drawing Sheets

(56) References Cited

OTHER PUBLICATIONS

Jared Newman, "Make Your Own Cartoons and Slideshows on YouTube" http://techland.time.com/2011/03/24/make-your-own-cartoons-and-slideshows-on-youtube. Archived on Apr. 24, 2011. Retrieved on Jun. 15, 2015 from <https://web.archive.org/web/20110424122433/http://techland.time.com/2011/03/24/make-your-own-cartoons-and-slideshows-on-youtube>.*

Tim Schmoyer, "How to Change Your YouTube Channel URL" http://www.reelseo.com/how-to-change-your-youtube-channel-url/. Archived on Oct. 7, 2011. Retrieved on Jun. 15, 2015 from <http://web.archive.org/web/20111007102254/http://www.reelseo.com/how-to-change-your-youtube-channel-url/>.*

Cathy Moore, "Avatars in elearning: Helpful? Annoying?", Retrieved from http://blog.cathy-moore.com/2007/08/avatars-in-elearning-helpful-annoying/, Published on Aug. 15, 2007.*

International Search Report of PCT/JP2013/071326 dated Sep. 17, 2013, 2 pages total.

* cited by examiner

FIG.7

| Page Report |
| --- |

Display Category : ⊙ Unique User   ○ Page View

Date Designation : [2010]Y[5]M[1]D~[2010]Y[7]M[1]D [Display]

■Unique User

| PageNo | Number of Accesses | Number of Abandonments | Abandonment Rate |
| --- | --- | --- | --- |
| Page1 | 641 | 76 | 11.9% |
| Page2 | 561 | 17 | 2.7% |
| Page3 | 545 | 21 | 3.3% |
| Page4 | 523 | 18 | 2.8% |
| Page5 | 505 | 12 | 1.9% |
| Page6 | 493 | 27 | 4.2% |
| Page7 | 465 | 23 | 3.6% |
| Page8 | 442 | 10 | 1.6% |
| Page9 | 430 | 10 | 1.6% |
| Page10 | 423 | 103 | 16.8% |
| Page11 | 319 | 319 | 49.8% |

→ CSV Download

PROGRAM IMAGE CREATION METHOD AND APPARATUS OF THE SAME

FIELD

This disclosure relates to a program image creation method and an apparatus of the same suitably used for a program image distribution system, for example.

BACKGROUND

Conventionally, a program image provided through the Internet or TV is created by computer graphics or created by combining the computer graphics with a real image (Japanese Patent No. 4725918).

In the conventional technique, the created program image is provided to a viewer by distributing the image to a terminal apparatus, and the information is provided in one way.

Therefore, a program image that allows two-way communication is demanded, in which the reaction of the viewer is reflected to change the image (information) according to the reaction.

SUMMARY

A program image is described that allows two-way communication for communication in a format of questions and answers.

In one embodiment, a program image creation method is provided that can create a program image based on input voice input information, image selection information, avatar selection information, decoration selection information, and interactive selection information. The program image creation method includes: an image processing step of setting a description image based on the image selection information; a voice processing step of synchronizing a voice from the voice input information with the image; an avatar processing step of combining an avatar that is set based on the avatar selection information with the description image; a decoration processing step of combining a decoration material that is set based on the decoration selection information with the description image; and an interactive processing step of setting a hyperlink based on the interactive selection information.

According to the configuration, for example, when a client (user) inputs voice input information, image selection information, avatar selection information, decoration selection information, and interactive selection information, a description image, an avatar, a decoration material, and an interactive constituent element are synchronized and combined, and voice information is combined. As a result, a program image is created according to a request of the client.

In another embodiment, a plurality of avatars can be prepared, and the avatar can be changed according to the voice information (for example, according to vowels) or a live-action avatar can be used to synchronize the voice information to form a more real image.

The decoration material can be synchronized as background music in another embodiment or can be synchronized as a sound effect in another embodiment. As a result, acoustic variations are provided, and the uniqueness of the program image is increased.

A button can be arranged on the description image, and the decoration material can be pronounced when the viewer operates the button. This promotes the participation of the viewer, and the interest for the program image can be increased.

In another embodiment, the decoration material can be a prepared animation, and the animation can be combined with the description image and displayed when a button arranged on the description image is operated. As a result, the program image can be visually changed by operation of the viewer. This promotes the participation of the viewer, and the interest for the program image can be increased.

In another embodiment, the decoration material can be a prepared animation, and the animation can be combined with the description image and displayed based on specific voice information included in the voice information. As a result, the program image can be automatically changed, and the specific voice information can be emphasized.

In the program image creation method, the voice input information can be an electronic voice obtained by converting an input document to a voice.

According to the configuration, the client can create voice information by text input.

Therefore, the voice information can be created by key input on an input screen, and the creation of the voice information is simplified.

In the program image creation method, the voice input information can be a natural voice.

According to the configuration, the client can read out a document toward a sound collector to directly create voice information, and a voice of the client can be used as voice information.

In the program image creation method described herein, the interactive processing step can be a process of arranging a button on the description image and associating the button with a prepared auxiliary screen.

According to the configuration, when the viewer operates the button on the description image, the screen is switched to an auxiliary screen corresponding to the button, and different information can be provided.

For example, a problem is presented on the main background screen, and a plurality of buttons indicating examples of answers are arranged. A correct buttons is associated with an auxiliary screen for displaying "correct", and an incorrect button is associated with an auxiliary screen for displaying "incorrect".

The presented content, the button names, and the content of the display on the auxiliary screen can be appropriately set to form a description image that allows communication in a format of questions and answers.

In another embodiment, a program image creation method is provided that can create a program image based on input voice input information, image selection information, avatar selection information, decoration selection information, and interactive selection information. The program image creation method includes: an image processing step of setting a description image based on the image selection information; a voice processing step of synchronizing a voice from the voice input information with the image; an avatar processing step of combining an avatar that is set based on the avatar selection information with the description image; a decoration processing step of combining a decoration material that is set based on the decoration selection information with the description image; an interactive processing step of setting a hyperlink based on the interactive selection information; a project recording step of recording the created program image; and a providing image selection step of automatically selecting the voice input information, the image selection information, the avatar selection information, the decoration selection information, and the interactive selection information based on the information recorded in the project recording step and transmitting the information to the processing steps.

According to the configuration, information of creation and change by the client is recorded in the client project recording step.

When the change information is accumulated, the tendency of requests by the client for the program image can be determined. Therefore, based on the determination information of the request tendency, the voice input information, the image selection information, the avatar selection information, the decoration selection information, and the interactive selection information can be automatically selected to create a program image.

In one embodiment, in the program image creation method, a state of access to the hyperlink of the program image is recorded.

According to the configuration, the state of access to the program image by the viewer can be recorded in the project recording step, and the information can be fed back to the voice input information, the image selection information, the avatar selection information, the decoration selection information, and the interactive selection information.

Therefore, the tendency of the interest of the viewer and the like can be reflected on the program image, and a program image according to the request by the viewer can be provided.

A program image for guiding the interest of the viewer in the direction intended by the client can also be created.

In another embodiment, a program image creation apparatus includes: voice input means for inputting voice information by a client; background setting means for setting a description image based on input image selection information; avatar setting means for setting a display avatar based on input avatar selection information; decoration setting means for setting a decoration material based on input decoration selection information; interactive setting means for setting a hyperlink based on interactive selection information; and project editing means for incorporating the voice information, the avatar, the decoration material, and the hyperlink into the description image.

The voice input means can be a voice conversion apparatus that converts an input document to a voice to generate an electronic voice or can be a sound collector that collects a natural voice.

According to the configuration, a program image creation apparatus that can effectively carry out the program image creation method can be provided.

The interactive setting means described herein can change the screen based on operation by the viewer. As a result, a program image that allows two-way communication can be created and provided.

BRIEF DESCRIPTION OF THE DRAWINGS

FIG. 7 is a statistical table showing an example of access information of a viewer used in an embodiment described herein;

DETAILED DESCRIPTION

Prior to describing the method, an embodiment of a program image creation apparatus for effectively carrying out the method will be described.

Figure 1:
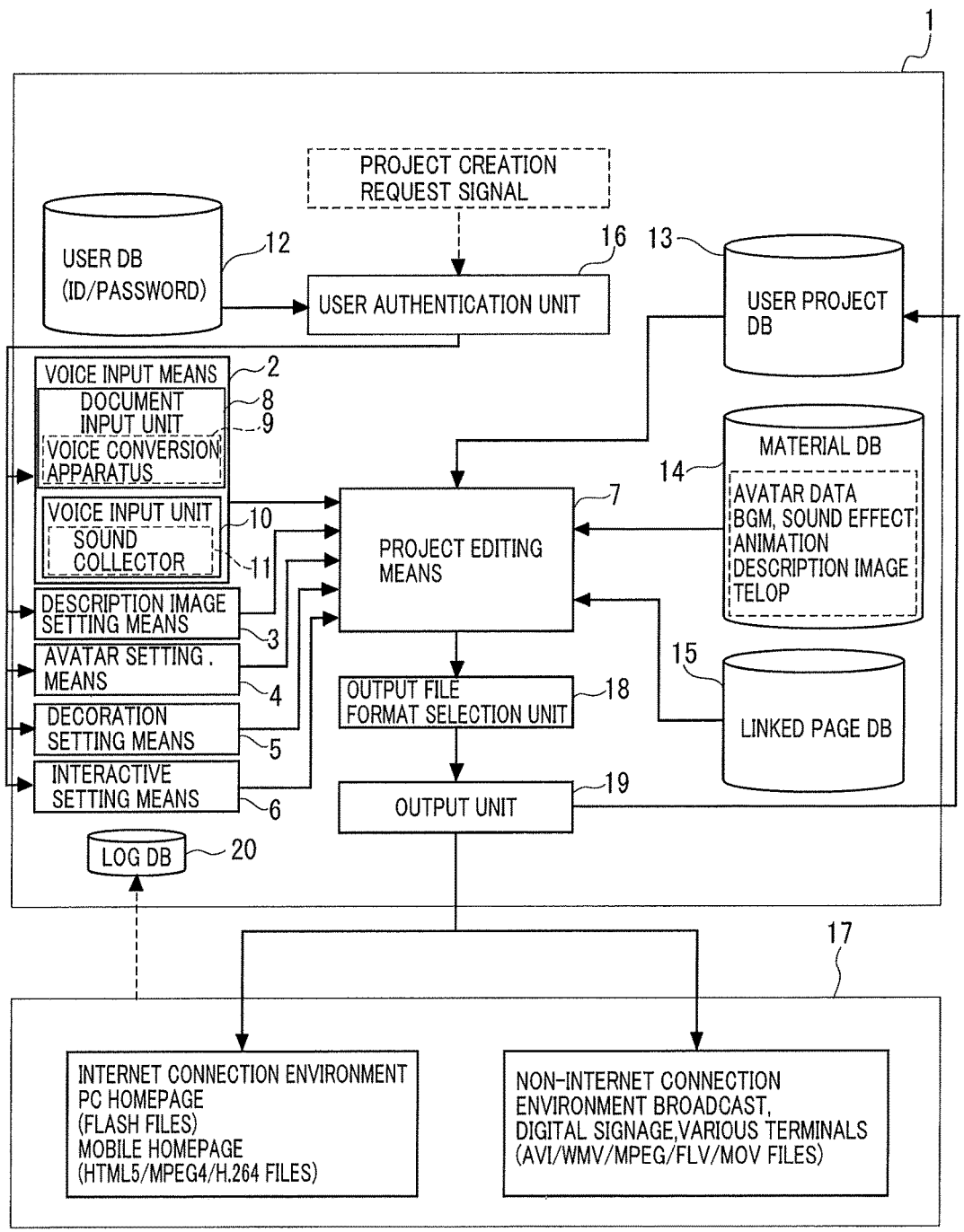
FIG. 1 is a block diagram of an embodiment described herein.

In FIG. 1, reference numeral 1 denotes a program image creation apparatus. The program image creation apparatus 1 includes: voice input means 2 for inputting voice information by a client; description image setting means 3 for setting a description image B based on input image selection information; avatar setting means 4 for setting a display avatar A based on input avatar selection information; decoration setting means 5 for setting a decoration material based on input decoration selection information; interactive setting means 6 for setting a hyperlink based on interactive selection information; and project editing means 7 for incorporating the voice information, the avatar A, the decoration material, and the hyperlink into the description image B.

Figure 3:
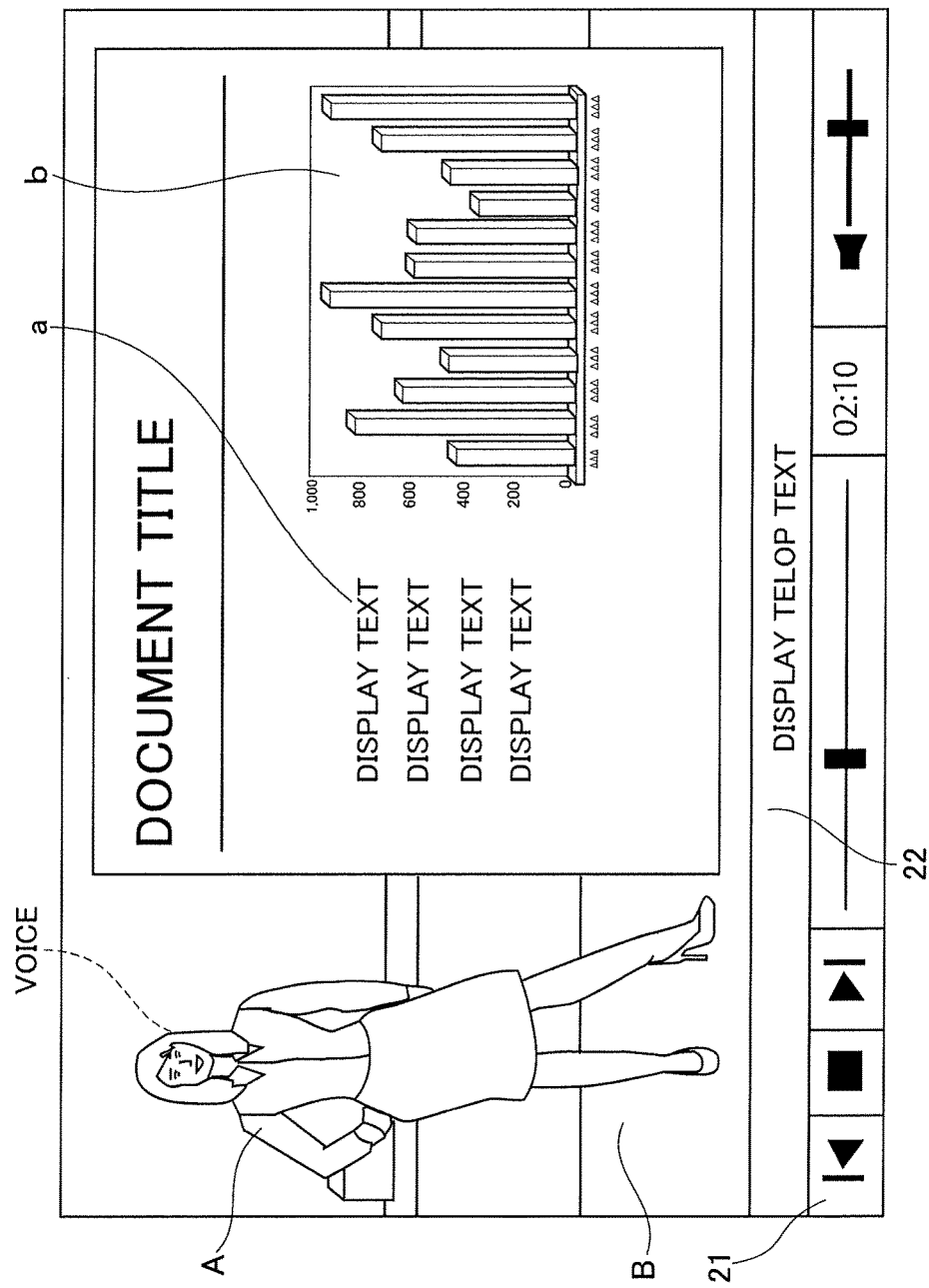
FIG. 3 is a schematic diagram showing a program image of an embodiment described herein.

The voice input means 2 includes: a document input unit 8 for inputting a document; a voice conversion apparatus 9 that converts the document to a voice to generate an electronic voice; and a voice input unit 10 including a sound collector 11 that collects a natural voice. In the document input unit 8, commercially available general-purpose software, such as PowerPoint, can be used to input a document file or the like for a description image that records character information or image information (see FIG. 3). In FIG. 3, "a" denotes a character image displayed by inputting a document file, and "b" denotes a graph image.

The program image creation apparatus 1 further includes various databases such as: a user database 12 storing an ID and a password of a user; a user project database 13 storing past projects of the user; a material database 14 storing decoration materials prepared for decoration; and a linked page database 15 storing an auxiliary screen used by the interactive setting means 6.

The program image creation apparatus 1 further includes a user authentication unit 16 that authenticates the user by comparing "user ID" and "password" included in an input project creation request signal based on information from the user database 12.

The program image creation apparatus 1 further includes: an output file format selection unit 18 that converts an edited project (i.e. program image) to a file format according to the type of the terminal 17 that receives the project; and an output unit 19 that transmits the project to the terminal 17.

The program image creation apparatus 1 further includes a log database 20 that receives and stores operation conditions in the terminal 17, etc.

Meanwhile, the project creation request signal includes voice information, image selection information for setting the description image, avatar selection information for setting the avatar A, decoration selection information for setting the decoration material, and interactive selection information for setting the hyperlink. The information is input to the voice input means 2, the description image setting means 3, the avatar setting means 4, the decoration setting means 5, and the interactive setting means 6.

Figure 2:
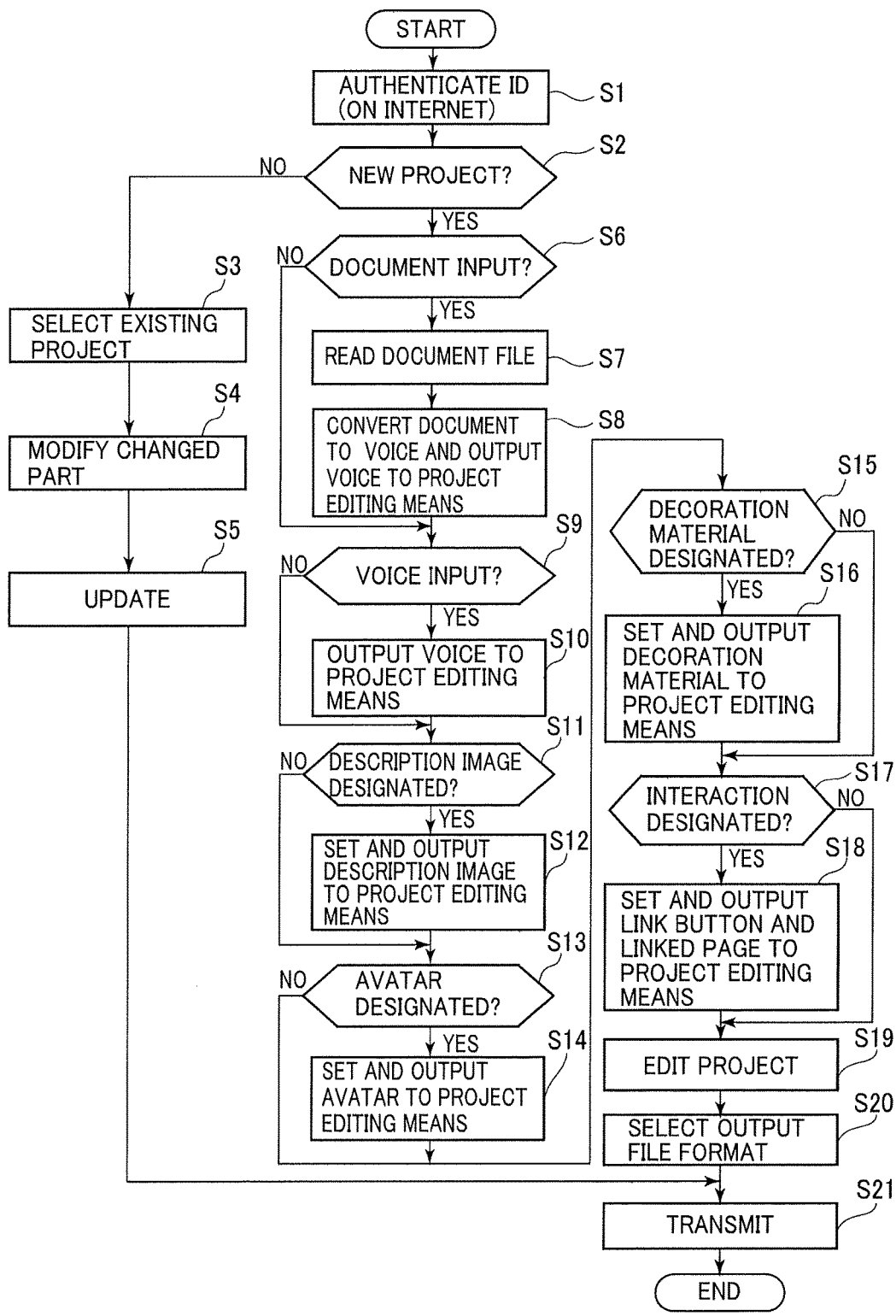
FIG. 2 is a flow chart showing processing steps of an embodiment described herein.

A program image creation method using the program image creation apparatus 1 with the foregoing configuration will be described with reference to a flow chart shown in FIG. 2.

A project creation request signal is input to the program image creation apparatus 1 to start the process. In step S1, "user ID" and "password" included in the project creation request signal are read, and ID authentication is performed by comparison with the storage information of the user database 12.

On the condition that the user is determined to be a normal user in step S1, the process moves to the following step S2, and whether the project is a new project is determined. If the project is not a new project, it is determined that the project is an existing project, and the process moves to step S3.

In step S3, the existing project is read from the user project database 13. The process moves to step S4, and the read existing project is modified if there is a change. In step S5, the read existing project is updated. The process moves to step S21 to transmit the project, and the process ends.

On the other hand, if it is determined that the project is a new project in step S2, the process moves to step S6, and whether a document (used for voice creation information) is input is determined. If a document is input, the process moves to the following step S7, and the document is read. In the following step S8, the document is converted to a voice signal and output to the project editing means 7. The process moves to step S9.

On the other hand, if it is determined that a document is not input in step S6, the process moves to step S9.

In step S9, whether a voice is input is determined. If a voice is input, the process moves to the following step S10. The voice information is output to the project editing means 7, and the process moves to step S11. If it is determined that a voice is not input, the process moves to step S11.

In step S11, whether a description image is designated is determined. If a description image is designated, the process moves to the following step S12. The description image B is set and output to the project editing means 7, and the process moves to step S13. If it is determined that a description image is not designated, the process moves to step S13.

In step S13, whether an avatar is designated is determined. If an avatar is designated, the process moves to the following step S14. The avatar is set and output to the project editing means 7, and the process moves to step S15. If it is determined that the avatar is not designated, the process moves to step S15.

In step S15, whether a decoration material is designated is determined. If a decoration material is designated, the process moves to the following step S16. The decoration material is set and output to the project editing means 7, and the process moves to step S17. If it is determined that a decoration material is not designated, the process moves to step S17. As used throughout this description, drawings and claims, the word "decoration" means dramatizing, producing, staging, enhancing or adding to a program by animation, graphics, sound effect(s), background music, and the like.

In step S17, whether an interaction is designated is determined. If an interaction is designated, the process moves to the following step S18. A button and an auxiliary screen corresponding to the button are set and output to the project editing means 7, and the process moves to step S19. If it is determined that an interaction is not designated, the process moves to step S19.

In step S19, the project editing means 7 edits the program image based on the output information from steps S8, S10, S12, S14, S16, and S18.

FIG. 3 shows an example of an edited program image.

A reproduction player 21 is arranged at the lower part of the set description image B, and the program image can be stopped, paused, or replayed. The set avatar A is arranged at a predetermined position of the description image B.

Voice information is synchronized with the program image, and the reproduction player 21 is operated to generate, stop, or regenerate the voice in synchronization with the reproduction of the program image.

If a telop is set as the decoration material, a format for displaying the telop is set based on the input document. As used throughout this description, drawings and claims, a telop is defined as text superimposed on a screen. Based on the setting, the telop is displayed above the reproduction player 21 of the description image B, for example (shown by reference numeral 22).

In an example of the format for displaying the telop, the input document can be displayed line by line, and the display time can be set according to the number of characters in the line.

The display time can be set by the following formula for example, wherein T denotes the display time of the line, X denotes the number of characters in the line, Z denotes the number of characters in the entire document, and W denotes the entire voice time.

$$T=(X/Z) \times W$$

Figure 4:
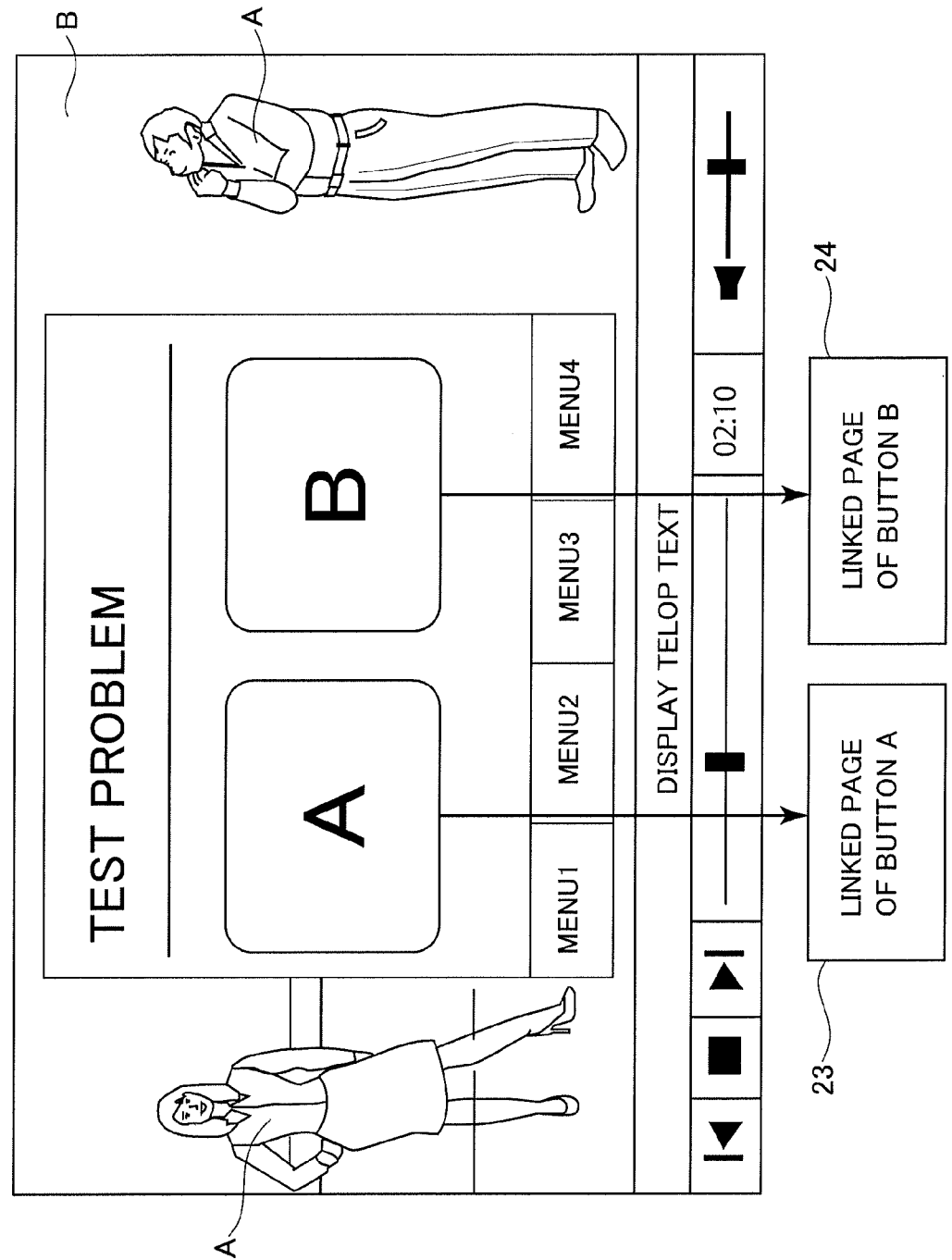
FIG. 4 is a schematic diagram showing a program image of an embodiment described herein.

A plurality of avatars A may be set as shown in FIG. 4. In this case, positions for combining the avatars A with the description image B are set, and voice information is allocated according to each avatar A.

FIG. 4 also shows an image when the interaction is designated.

In this example, two buttons, button A and button B, are set, and hyperlinks are formed by linked pages 23 and 24 as auxiliary screens that are set corresponding to the buttons. When the user operates the button A, the description image B is switched to the linked page 23. When the user operates the button B, the description image B is switched to the linked page 24.

The number of hyperlinks is not limited to two, and three or more hyperlinks can be set at arbitrary positions. Moreover, the hyperlinks may be arranged not only in one stage, but may also be multiplexed and linked in a tree format.

This expands the two-way communication in the format of questions and answers.

Figure 5:
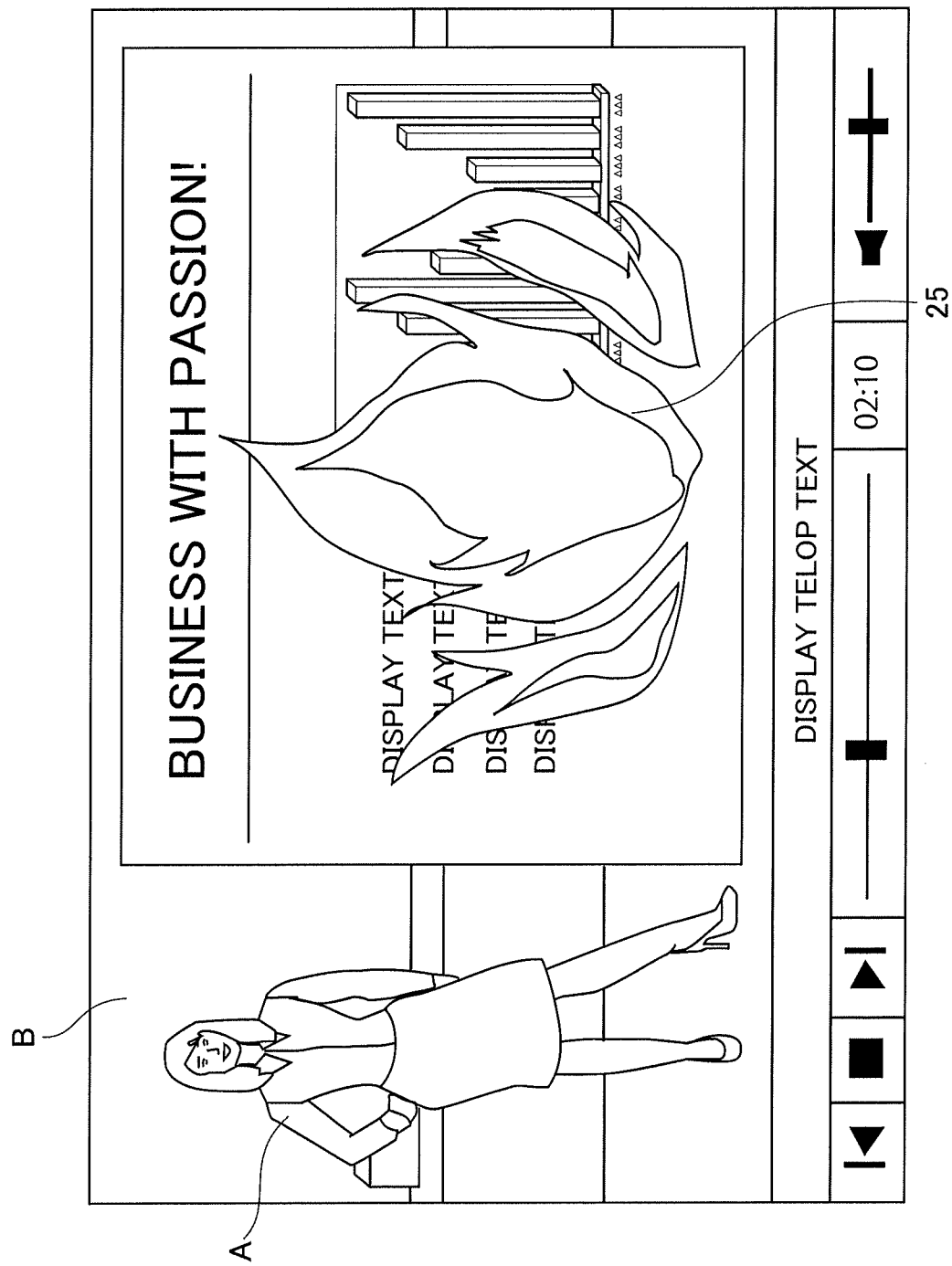
FIG. 5 is a schematic diagram showing a program image of an embodiment described herein.

FIG. 5 shows a program image when an animation is selected as a decoration material.

This animation is set according to a specific section of an input document. For example, an "animation of gradually spreading fire" is prepared according to a document "passion". When "passion" is pronounced in the voice, an "animation of spreading fire 25" is displayed on the description image B, triggered by the pronunciation.

This can provide the viewer with a large visual change, and the interest of the viewer can be increased.

The two-way communication in the format of questions and answers is also enabled. Synergistic effects of the images, voices, and a variety of decoration effects allow usage in a wide range of applications, such as electronic learning materials using computers used for learning, electronic presentation means in seminars, electronic operation manuals, and electronic support manuals.

The constituent members shown in the embodiments are examples, and various changes can be made based on a request by the client, a design request, etc.

For example, sound effects, background music, and the like can be set as the decoration materials. Buttons corresponding to the decoration materials may be displayed, and the viewer may operate the buttons to activate the decoration materials, instead of the activation based on the voice information.

The voice input information, the image selection information, the avatar selection information, the decoration selection information, and the interactive selection information are not only directly input to the program image creation apparatus 1 using communication means, but are also input using various media.

Figure 6:
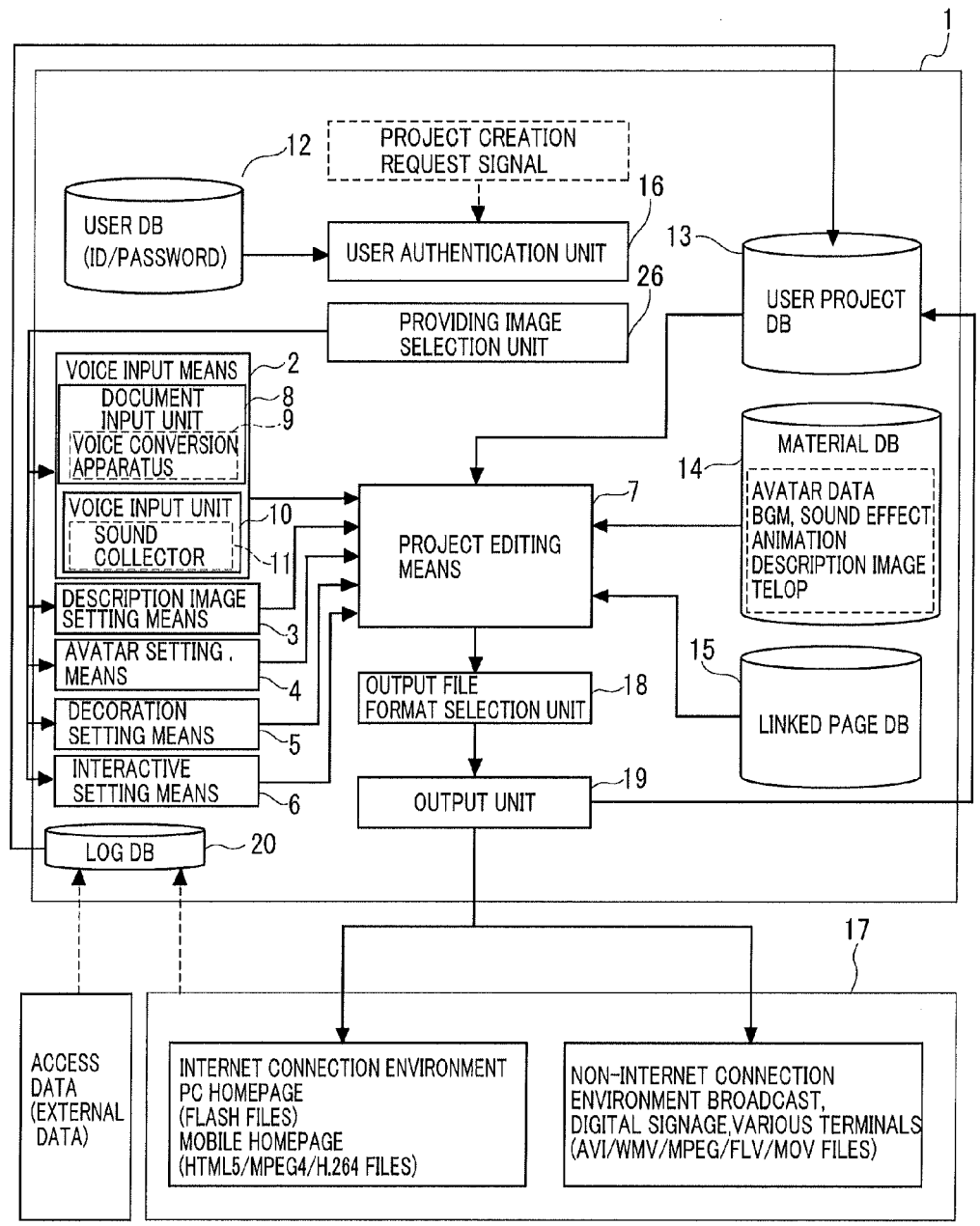
FIG. 6 is a block diagram showing an embodiment described herein.

Meanwhile, FIG. 6 is a block diagram showing an embodiment of an apparatus for carrying out another embodiment. In the illustrated example, the apparatus includes: the user project database 13 recording the created program image; and a providing image selection unit 26 that automatically selects the voice input information, the image selection information, the avatar selection information, the decoration selection information, and the interactive selection information based on the information recorded in the user project database 13 to transmit the information to the processing steps.

Access data related to the access status of the viewer is input to the log database 20 and is then transmitted and recorded in the user project database 13.

Figure 8:
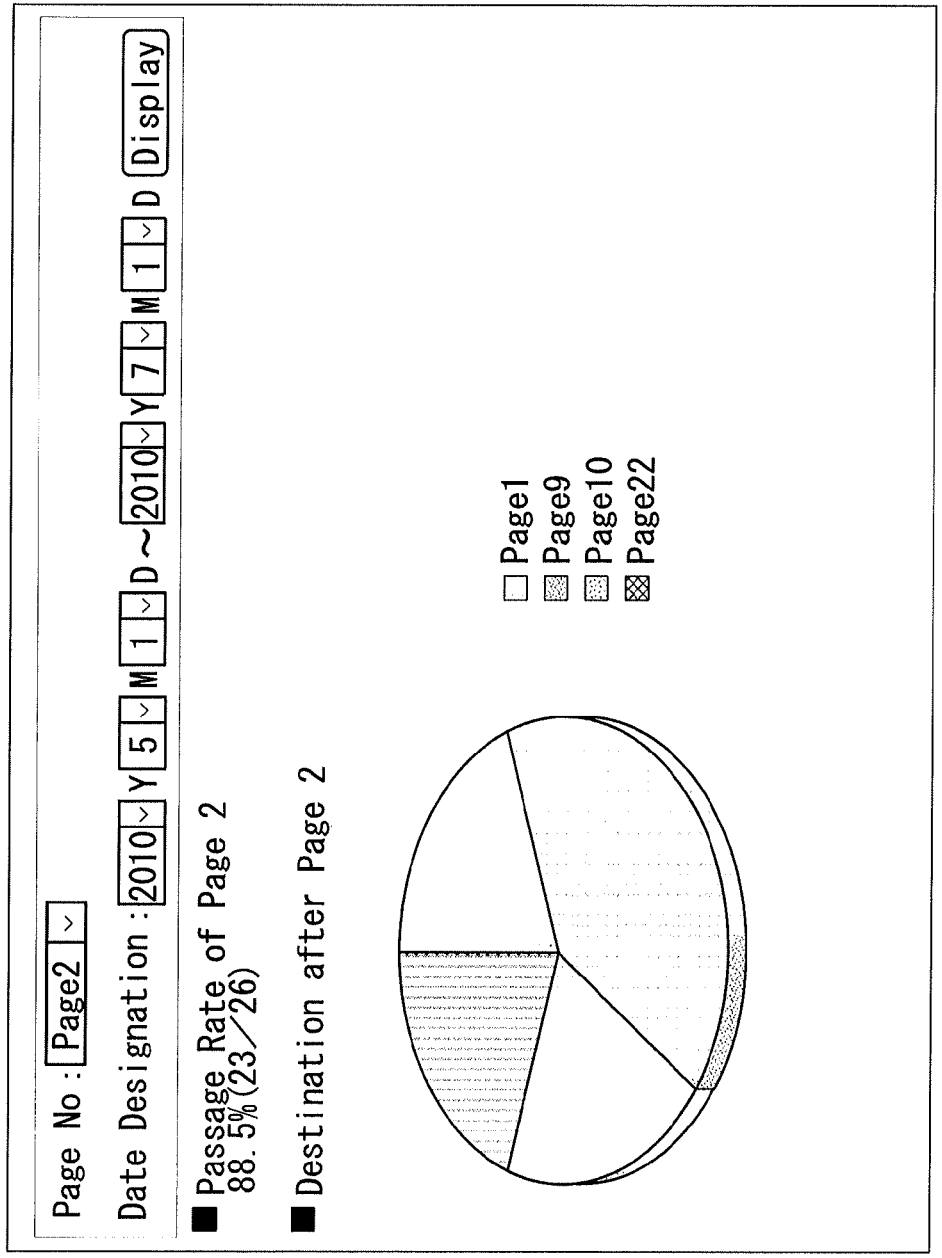
FIG. 8 is a statistical table showing an example of the access information of the viewer used in another embodiment.

In the user project database 13, the numbers of accesses to the linked pages 23, 24, . . . , the numbers of abandonments of the accessed pages, the abandonment rates, and the like are calculated as shown in FIG. 7 based on the access data of the viewer input through the log database 20. As shown in FIG. 8, the numbers of passages and passage rates of the linked pages 23, 24, . . . as well as destinations from the linked pages 23, 24, . . . are compiled and recorded.

Figure 9:
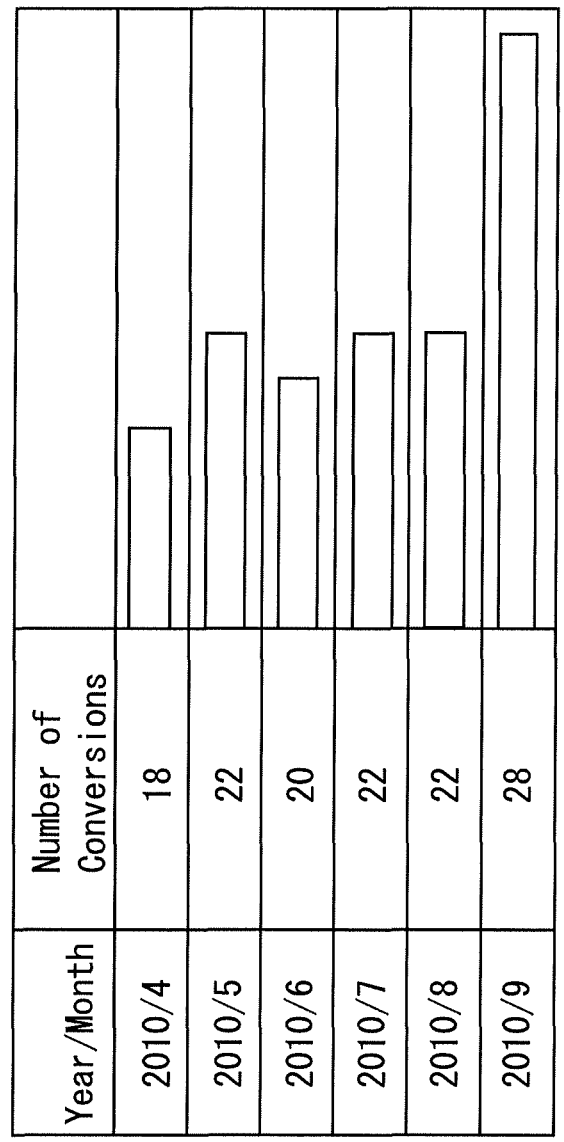
FIG. 9 is a statistical table showing an example of the access information of the viewer used in another embodiment.

Furthermore, as shown in FIG. 9, the numbers of purchases or participations are compiled and recorded when the linked pages 23, 24, . . . include pages for purchase or participation, for example.

Therefore, the tendency of access by the viewer is figured out from the access data.

The providing image selection unit 26 acquires the access data of the viewer analyzed and recorded based on the access data of the viewer recorded in the user project database 13. Based on the access data, the providing image selection unit 26 automatically selects the voice input information, the image selection information, the avatar selection information, the decoration selection information, and the interactive selection information from the material database 14 and transmits the information to the voice input means 2, the description image setting means 4, the decoration setting means 5, and the interactive setting means 6.

As a result, the tendency of the interest of the viewer and the like can be reflected on the program image, and a program image according to the request by the viewer can be provided.

A program image for guiding the interest of the viewer in the direction intended by the client can also be created.

REFERENCE SIGNS LIST

1 program image creation apparatus
2 voice input means
3 description image setting means
4 avatar setting means
5 decoration setting means
6 interactive setting means
7 project editing means
8 document input unit
9 voice conversion apparatus
10 sound collector
11 voice input unit
12 user database
13 user project database
14 material database
15 linked page database
16 user authentication unit
17 terminal
18 output file format selection unit
19 output unit
20 log database
21 reproduction player
22 telop
23 linked page
24 linked page
25 animation
26 providing image selection unit
A avatar
B description image

What is claimed is:

1. A program image creation method that creates a program image based on input voice input information, image selection information, avatar selection information, decoration selection information, and interactive selection information, the program image creation method comprising:
    an image processing step of setting a description image based on the image selection information, the description image appears in the created program image;
    a voice processing step of synchronizing a voice from the voice input information with the created program image;
    an avatar processing step of combining an avatar that is set based on the avatar selection information with the description image, the avatar appearing in a predetermined location of the description image within the created program image;
    a decoration processing step of combining a decoration material that is set based on the decoration selection information with the description image, the decoration material appearing in the created program image;
    an interactive processing step of setting two or more hyperlinks based on the interactive selection information, the two or more hyperlinks appearing in the created program image and the two or more hyperlinks are selectable, wherein the the two or more hyperlinks are in the form of first and second selectable buttons separate from the avatar, wherein the first selectable button is associated with a first auxiliary screen and the second selectable button is associated with a second auxiliary screen, wherein the description image includes a background portion and a foreground portion, the foreground portion being overlaid on the background portion, wherein the first and second selectable buttons are displayed in the foreground portion, and when the first selectable button is selected, the foreground portion displaying the second selectable button is replaced by the first auxiliary screen, when the second selectable button is selected, the foreground portion displaying the first selectable button is replaced by the second auxiliary screen, and the background portion of the description image is unchanged; and displaying the created program image on a display device, the created program image including a reproduction player displayed at a bottom of the description image.

2. The program image creation method according to claim 1, wherein the voice input information is an electronic voice obtained by converting an input document to a voice.

3. The program image creation method according to claim 1, wherein the voice input information is a natural voice.

4. The program image creation method according to claim 1, wherein a plurality of types of avatars are stored in a database, and a specific avatar is extracted from the plurality of avatars based on the avatar selection information.

5. The program image creation method according to claim 1, wherein the decoration material is prepared background music.

6. The program image creation method according to claim 1, wherein the decoration material is a prepared sound effect, and the sound effect is generated when a button arranged on the description image is operated.

7. The program image creation method according to claim 1, wherein the decoration material is a prepared animation, and the animation is combined with the description image and displayed when a button arranged on the description image is operated.

8. The program image creating method according to claim 1, wherein the decoration material is a prepared animation, and the animation is combined with the description image and displayed based on specific voice information included in the voice input information.

9. The program image creation method according to claim 1, wherein the decoration material is a telop overlaid on the description image and appearing above the reproduction player, the telop being based on the voice input information and appearing in the created program image line by line, with a display time being set based on a number of characters in each line.

10. The program image creation method according to claim 1, wherein the predetermined location is fixed such that the avatar remains in the predetermined location.

11. The program image creation method according to claim 1, wherein the first and second selectable buttons are based on answers to a question.

12. A program image creation method that creates a program image based on input voice input information, image selection information, avatar selection information, decoration selection information, and interactive selection information, the program image creation method comprising:
an image processing step of setting a description image based on the image selection information, the description image appears in the created program image;
a voice processing step of synchronizing a voice from the voice input information with the created program image;
an avatar processing step of combining an avatar that is set based on the avatar selection information with the description image, the avatar appearing in the created program image;
a decoration processing step of combining a decoration material that is set based on the decoration selection information with the description image, the decoration material appearing in the created program image;
an interactive processing step including arranging first and second selectable buttons separate from the avatar on the description image, wherein the first selectable button is associated with a first auxiliary screen and the second selectable button is associated with a second auxiliary screen, wherein the description image includes a background portion and a foreground portion, the foreground portion being overlaid on the background portion, wherein the first and second selectable buttons are displayed in the foreground portion, and when the first selectable button is selected, the foreground portion displaying the second selectable button is replaced by the first auxiliary screen, when the second selectable button is selected, the foreground portion displaying the first selectable button is replaced by the second auxiliary screen, and the background portion of the description image is unchanged;
a project recording step of recording the created program image;
a providing image selection step of automatically selecting the voice input information, the image selection information, the avatar selection information, the decoration selection information, and the interactive selection information based on the information recorded in the project recording step and transmitting the information to the processing steps; and
displaying the created program image on a display device, the created program image including a reproduction player displayed at a bottom of the description image.

13. The program image creation method according to claim 12, wherein in the project recording step, a state of access to the hyperlink of the program image is recorded.

14. A program image creation apparatus that creates a program image, comprising:
a voice input that permits input of voice information that will be present in a created program image;
a description image setter that sets a description image based on input image selection information, the description image appearing in the created program image;
an avatar setter that sets a display avatar based on input avatar selection information, the avatar appearing in the created program image;
a decoration setter that sets a decoration material based on input decoration selection information, the decoration material appearing in the created program image;
an interactive setter that sets two or more hyperlinks based on interactive selection information, the two or more hyperlinks being based on a prepared description image, the two or more hyperlinks are in the form of first and second selectable buttons appearing in the created program image and being overlaid on the description image and separate from the avatar, wherein the first selectable button is associated with a first auxiliary screen and the second selectable button is associated with a second auxiliary screen, wherein the description image includes a background portion and a foreground portion, the foreground portion being overlaid on the background portion, wherein the first and second selectable buttons are displayed in the foreground portion, and when the first selectable button is selected, the foreground portion displaying the second selectable button is replaced by the first auxiliary screen, when the second selectable button is selected, the foreground portion displaying the first selectable button is replaced by the second auxiliary screen, and the background portion of the description image is unchanged;
a reproduction player that stops, pauses, or replays the program image; and
a project editor that creates the program image by incorporating the voice information, the avatar, the decoration material, the hyperlink, and the reproduction player into the description image.

15. The program image creation apparatus according to claim 10, wherein the voice input comprises a voice conversion apparatus that converts an input document to a voice to generate an electronic voice.

16. The program image creation apparatus according to claim 10, wherein the voice input comprises a sound collector that collects a natural voice.

* * * * *